US010061526B2

(12) United States Patent
Mashey et al.

(10) Patent No.: US 10,061,526 B2
(45) Date of Patent: *Aug. 28, 2018

(54) FRAME BUFFER ACCESS TRACKING VIA A SLIDING WINDOW IN A UNIFIED VIRTUAL MEMORY SYSTEM

(71) Applicant: NVIDIA Corporation, Santa Clara, CA (US)

(72) Inventors: John Mashey, Portola Valley, CA (US); Cameron Buschardt, Round Rock, TX (US); James Leroy Deming, Madison, AL (US); Jerome F. Duluk, Jr., Palo Alto, CA (US); Brian Fahs, Los Altos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/169,532

(22) Filed: May 31, 2016

(65) Prior Publication Data

US 2017/0199689 A1    Jul. 13, 2017

Related U.S. Application Data

(63) Continuation of application No. 14/105,015, filed on Dec. 12, 2013, now Pat. No. 9,355,041.

(60) Provisional application No. 61/800,004, filed on Mar. 15, 2013, provisional application No. 61/785,735, filed on Mar. 14, 2013.

(51) Int. Cl.
  *G06F 3/06* (2006.01)
  *G06F 12/1027* (2016.01)
  *G06F 12/1009* (2016.01)

(52) U.S. Cl.
  CPC .......... *G06F 3/0622* (2013.01); *G06F 3/0631* (2013.01); *G06F 3/0647* (2013.01); *G06F 3/0685* (2013.01); *G06F 12/1009* (2013.01); *G06F 12/1027* (2013.01); *G06F 2212/656* (2013.01); *G06F 2212/684* (2013.01)

(58) Field of Classification Search
  None
  See application file for complete search history.

(56) References Cited

U.S. PATENT DOCUMENTS

2014/0281264 A1    9/2014    Duluk, Jr. et al.

*Primary Examiner* — Kevin Verbrugge
(74) *Attorney, Agent, or Firm* — Artegis Law Group, LLP (57) ABSTRACT

One embodiment of the present invention is a memory subsystem that includes a sliding window tracker that tracks memory accesses associated with a sliding window of memory page groups. When the sliding window tracker detects an access operation associated with a memory page group within the sliding window, the sliding window tracker sets a reference bit that is associated with the memory page group and is included in a reference vector that represents accesses to the memory page groups within the sliding window. Based on the values of the reference bits, the sliding window tracker causes the selection a memory page in a memory page group that has fallen into disuse from a first memory to a second memory. Because the sliding window tracker tunes the memory pages that are resident in the first memory to reflect memory access patterns, the overall performance of the memory subsystem is improved.

23 Claims, 5 Drawing Sheets

FRAME BUFFER ACCESS TRACKING VIA A SLIDING WINDOW IN A UNIFIED VIRTUAL MEMORY SYSTEM

CROSS-REFERENCE TO RELATED APPLICATIONS

This application is a continuation of the co-pending U.S. patent application titled, "FRAME BUFFER ACCESS TRACKING VIA A SLIDING WINDOW IN A UNIFIED VIRTUAL MEMORY SYSTEM," filed on Dec. 12, 2013 and having application Ser. No. 14/105,015, which claims priority benefit of the United States Provisional Patent Application titled, "CPU-TO-GPU AND GPU-TO-GPU ATOMICS," filed on Mar. 15, 2013 and having Application No. 61/800,004, and also claims priority benefit of the United States Provisional Patent Application titled, "FRAME BUFFER ACCESS TRACKING VIA SLIDING WINDOW HARDWARE IN A UNIFIED VIRTUAL MEMORY SYSTEM," filed on Mar. 14, 2013 and having Application No. 61/785,735. The subject matter of these related applications is hereby incorporated herein by reference.

BACKGROUND OF THE INVENTION

Field of the Invention

The present invention generally relates to computer science and, more specifically, to frame buffer access tracking via a sliding window in a unified virtual memory system.

Description of the Related Art

A typical computer system includes a central processing unit (CPU) and a parallel processing unit (PPU). Some PPUs are capable of very high performance using a relatively large number of small, parallel execution threads on dedicated programmable hardware processing units. The specialized design of such PPUs usually allows these PPUs to perform certain tasks, such as rendering 3-D scenes, much faster than a CPU. However, the specialized design of these PPUs also limits the types of tasks that the PPU can perform. By contrast, the CPU is typically a more general-purpose processing unit and therefore can perform most tasks. Consequently, the CPU usually executes the overall structure of a software application and then configures the PPU to implement tasks that are amenable to parallel processing.

As software applications execute on the computer system, the CPU and the PPU perform memory operations to store and retrieve data in physical memory locations. Some advanced computer systems implement a unified virtual memory architecture (UVM) common to both the CPU and the PPU. Among other things, the architecture enables the CPU and the PPU to access a physical memory location using a common (e.g., the same) virtual memory address, regardless of whether the physical memory location is within system memory or memory local to the PPU (PPU memory).

Typically, the PPU memory is relatively small, as compared to the CPU memory, and application programs reference more memory pages than the PPU memory is capable of storing. When the PPU memory is over-committed, the operating system (OS) selects memory pages to migrate from the PPU memory to the system memory in order to allow storage of newly-referenced memory pages. In some computer systems, an operating system (OS) randomly selects the memory pages to migrate. However, since the OS may select a memory page that is subsequently accessed by the PPU for migration, such an approach may reduce the performance of the PPU.

In another approach, the OS repurposes a previously-unused bit in each PPU page table entry (PTE) to track PPU memory pages that have been recently referenced. In operation, the OS temporarily turns off all access rights to a set of memory pages included in the PPU memory. If the PPU references a memory page included in this set of memory pages, then a page fault is generated. In response to the page fault, the OS restores access to the memory page and sets the PTE bit associated with accesses to the memory page to indicate that the memory page has recently been accessed. The OS preferentially selects memory pages that are not associated with a set access bit for migration from the PPU memory to the CPU memory.

While such an approach reduces the likelihood that the OS migrates memory pages that are subsequently accessed by the PPU, resolving the generated page faults degrades the overall performance of the computer system. Additionally, setting a bit in the PTE generally requires a read-modify-write operation on the PTE, which is a significant overhead, because the performance path in the PPU memory management unit (PPU MMU) performs only read operations. Further, if the PTE does not include any unused bits, this PTE-based approach allocates PPU memory for storing an access tracking bit for each memory page. Consequently, this approach undesirably reduces the amount of PPU memory available for storage of application program data.

As the foregoing illustrates, what is needed in the art is a more effective and efficient approach to tracking accesses to memory pages in a unified virtual memory architecture, especially to locate pages not recently referenced.

SUMMARY OF THE INVENTION

One embodiment of the present invention includes a memory subsystem that includes a first memory, a second memory coupled to the first memory, and a sliding window tracker coupled to the second memory. The sliding window tracker is configured to detect a first access operation associated with a first memory page group included within a sliding window; perform a write operation to set a first reference bit included in a reference vector and corresponding to the first memory page group to an active value; indicate that a second memory page group has not yet been assessed based on an inactive value of a second reference bit included in the reference vector, where the second memory page group also is included within the sliding window; and in response to the active value of the first reference bit and the inactive value of the second reference bit, cause the selection of a memory page in the second memory page group to migrate from the second memory to the first memory.

One advantage of the disclosed techniques is that the sliding window tracker enables the judicious selection of memory pages that have fallen into disuse for migration between memories. Consequently, the overall performance of the memory subsystem is increased compared to memory subsystems that implement conventional random selection techniques. Further, because the sliding window tracker does not provoke page faults, the memory subsystem does not incur the performance degradation associated with conventional fault-based access tracking techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
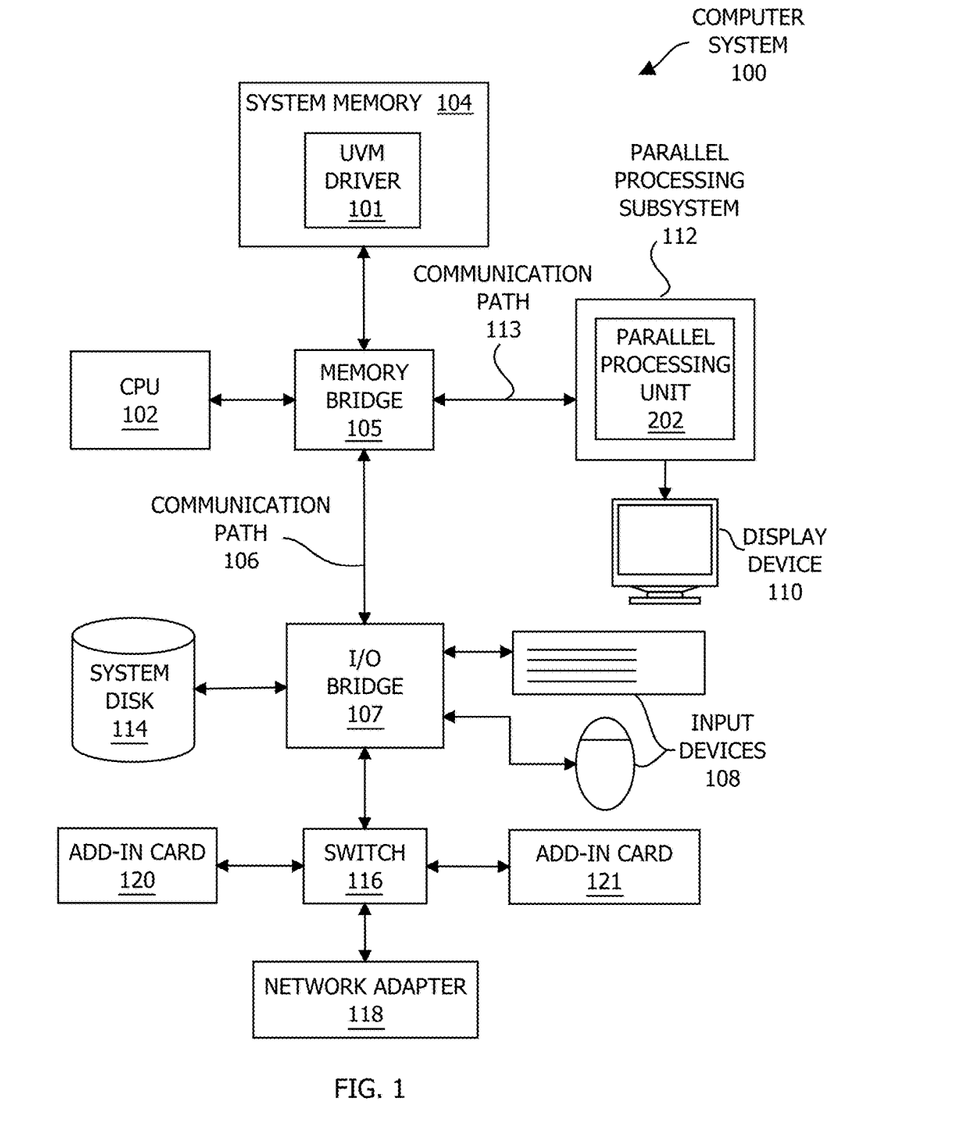
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (GPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread groups. The series of instructions transmitted to a particular GPC constitutes a thread, as previously defined herein, and the collection of a certain number of concurrently executing threads across the parallel processing engines within an SM is referred to herein as a "warp" or "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CTA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202. Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
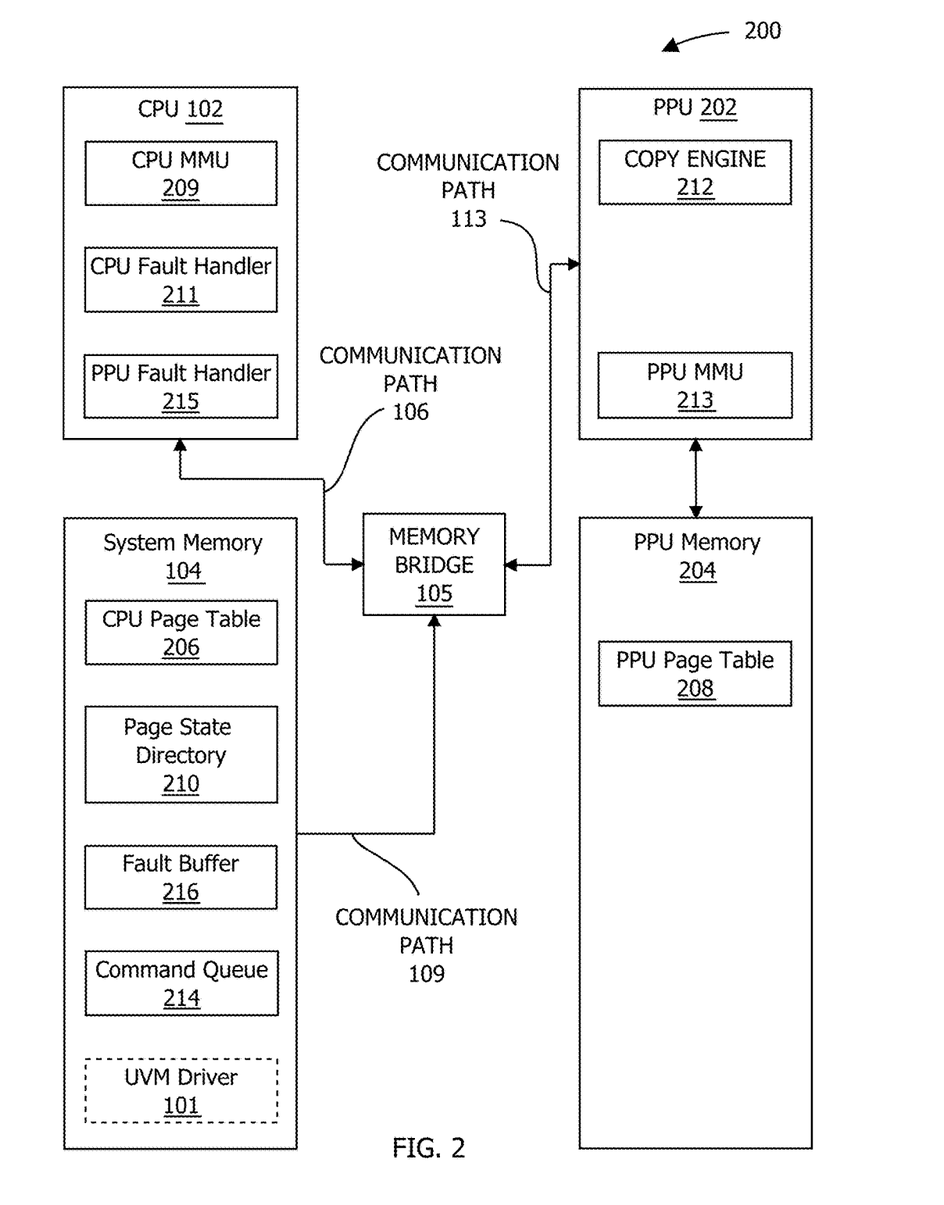
FIG. 2 is a block diagram illustrating a unified virtual memory system (UVM), according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being provoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 210, the fault buffer 216, and one or more command queues 214 may be stored in the PPU memory 204. Further, a PPU page table 208 may be stored in the system memory 104.

In a similar manner as with the CPU 102, the PPU 202 executes instructions that may request data stored in the system memory 104 or the PPU memory 204 via a virtual memory address. The PPU 202 includes a PPU MMU 213, which processes requests from the PPU 202 for translating virtual memory addresses to physical memory addresses. The PPU 202 also includes a copy engine 212, which executes commands stored in the command queue 214 for copying memory pages, modifying data in the PPU page table 208, and other commands. A PPU fault handler 215 executes steps in response to a page fault on the PPU 202. The PPU fault handler 215 can be software running on a processor or dedicated microcontroller in the PPU 202. Alternatively, the PPU fault handler 215 can be combination of software running on the CPU 102 and software running on the dedicated microcontroller in the PPU 202, communicating with each other. In some embodiments, the CPU fault handler 211 and the PPU fault handler 215 can be a unified software program that is invoked by a fault on either the CPU 102 or the PPU 202. The command queue 214 may be in either the PPU memory 204 or the system memory 104, but is preferentially located in the system memory 104.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and memory swizzling type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Translating Virtual Memory Addresses

When a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses may refer to the same data, but may not map to the same physical memory address (e.g., the CPU 102 and the PPU 202 may each have a local read-only copy of the data.)

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the page and then determines the appropriate page fault sequence. The page fault sequence generally maps the memory page associated with the requested virtual memory address or changes the types of accesses permitted (e.g., read access, write access, atomic access). The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned page resides in the PPU memory 204, but can reside in the system memory 104 when migration from the system memory 104 to the PPU memory 204 is not done, generally due to the short-term nature of the PPU ownership. Finally, a memory page is considered CPU-shared if the memory page is stored in the system memory 104 and a mapping to the memory page exists in the PPU page table 208 that allows the PPU 202 to access the memory page in the system memory 104 via a virtual memory address.

The UVM system 200 may assign ownership states to memory pages based on a variety of factors, including the usage history of the memory page. Usage history may include information regarding whether the CPU 102 or the PPU 202 accessed the memory page recently, and how many times such accesses were made. For example, the UVM system 200 may assign an ownership state of "CPU-owned" for a given memory page and locate the page in system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the page in PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:
(a) on the CPU 102 access to an unmapped page that is mapped to the PPU 202, that has not been recently migrated, unmap the faulting page from the PPU 202, migrate the page to the CPU 102, and map the page to the CPU 102;
(b) on the PPU 202 access to an unmapped page that is mapped to the CPU 102, that has not been recently migrated, unmap the faulting page from the CPU 102, migrate the page to the PPU 202, and map the page to the PPU 202;
(c) on the CPU 102 access to an unmapped page that is mapped to the PPU 202, that has been recently migrated, migrate the faulting page to the CPU 102 and map the page on both the CPU 102 and the PPU 202;
(d) on the PPU 102 access to an unmapped page that is mapped on the CPU 102, that has been recently migrated, map the page to both the CPU 102 and the PPU 202;
(e) on the PPU 102 atomic access to page that is mapped to both the CPU 102 and the PPU 202 but not enabled for atomic operations by the PPU 202, unmap the page from the CPU 102, and map to the PPU 202 with atomic operations enabled;
(f) on the PPU 102 write access to page that is mapped on the CPU 102 and PPU 202 as copy-on-write (COW), copy the page to the PPU 202, thereby making independent copies of the page, mapping the new page as read-write on the PPU, and leaving the current page as mapped on the CPU 102;
(g) on the PPU 102 read access to page that is mapped on the CPU 102 and PPU 202 as zero-fill-on-demand (ZFOD), allocate a page of physical memory on the PPU 202 and fill it with zeros, and map that page on the PPU, but change it to unmapped on the CPU 102.
(h) on an access by a first PPU 202(1) to an unmapped page that is mapped on a second PPU 202(2), that has not been recently migrated, unmap the faulting page from the second PPU 202(2), migrate the page to the first PPU 202(1), and map the page to the first PPU 202(1); and
(i) on an access by a first PPU 202(1) to an unmapped page that is mapped on a second PPU 202(2), that has been recently migrated, map the faulting page to the first PPU 202(1), and keep the mapping of the page on the second PPU 202(2).

In sum, many heuristic rules are possible, and the scope of the present invention is not limited to these examples.

In addition, any migration heuristic can "round up" to include more pages or a larger page size, for example:
(j) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, and map the pages to the CPU 102 (in more detailed example: for a 4 kB faulted page, migrate the aligned 64 kB region that includes the 4 kB faulted page);
(k) on the PPU 202 access to an unmapped page that is mapped to the CPU 102, that has not been recently migrated, unmap the faulting page, plus additional pages that are adjacent to the faulting page in the virtual address space, from the CPU 102, migrate the pages to the PPU 202, and map the pages to the PPU 202 (in more detailed example: for a 4 kB faulted page, migrate the aligned 64 kB region that includes the 4 kB faulted page);
(l) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, map the pages to the CPU 102, and treat all the migrated pages as one or more larger pages on the CPU 102 (in more detailed example: for a 4 kB faulted page, migrate the aligned 64 kB region that includes the 4 kB faulted page, and treat the aligned 64 kB region as a 64 kB page);

(m) on the PPU 202 access to an unmapped page that is mapped on the CPU 102, that has not been recently migrated, unmap the faulting page, plus additional pages that are adjacent to the faulting page in the virtual address space, from the CPU 102, migrate the pages to the PPU 202, map the pages to the PPU 202, and treat all the migrated pages as one or more larger pages on the PPU 202 (in more detailed example: for a 4 kB faulted page, migrate the aligned 64 kB region that includes the 4 kB faulted page, and treat the aligned 64 kB region as a 64 kB page);

(n) on the access by a first PPU 202(1) to an unmapped page that is mapped to a second PPU 202(2), that has not been recently migrated, unmap the faulting page, plus additional pages that are adjacent to the faulting page in the virtual address space, from the second PPU 202(2), migrate the pages to the first PPU 202(1), and map the pages to the first PPU 202(1); and (o) on an access by a first PPU 202(1) to an unmapped page that is mapped to a second PPU 202(2), that has been recently migrated, map the faulting page, plus additional pages that are adjacent to the faulting page in the virtual address space, to the first PPU 202(1), and keep the mapping of the page on the second PPU 202(2).

In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular page is in the process of being transitioned from CPU-owned to PPU-owned. Various units in the CPU 102 and the PPU 202, such as the CPU fault handler 211 and the PPU fault handler 215, upon determining that a page is in such a transitional state, may forego portions of a page fault sequence to avoid steps in a page fault sequence triggered by a prior virtual memory access to the same virtual memory address. As a specific example, if a page fault results in a page being migrated from the system memory 104 to the PPU memory 204, a different page fault that would cause the same migration is detected and does not cause another page migration. Further, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses.

Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence. Commands executed by the copy engine 212 may include, among other things, deleting, creating, or modifying page table entries in the PPU page table 208, reading or writing data from the system memory 104, and reading or writing data to the PPU memory 204.

The fault buffer 216 stores fault buffer entries that indicate information related to page faults generated by the PPU 202. Fault buffer entries may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry into the fault buffer 216 to inform the PPU fault handler 215 about the faulting page and the type of access that caused the fault. The PPU fault handler 215 then performs actions to remedy the page fault. The fault buffer 216 can store multiple faults because the PPU 202 is executing a plurality of threads, where each thread can cause a one or more faults due the pipelined nature of the memory accesses of the PPU 202.

Page Fault Sequences

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address. After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid page is cached. At this point, the page fault sequence is complete. The ownership state for the memory page is CPU-shared, meaning that the memory page is accessible to both the CPU 102 and the PPU 202.

Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the page or the type of memory access, the PPU fault handler 215 determines that a new ownership state for the page is PPU-owned.

The PPU 202 writes a fault buffer entry into fault buffer 216 that indicates that the PPU 202 generated a page fault, and indicates the virtual memory address associated with the page fault. The PPU fault handler 215 executing on the CPU 102 reads the fault buffer entry and, in response, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the page from the system memory 104 into the PPU memory 204. The copy engine 212 in the PPU 202 reads the commands in the command queue 214 and copies the page from the system memory 104 to the PPU memory 204. The PPU 202 writes a page table entry into the PPU page table 208 corresponding to the virtual memory address and associating the virtual memory address with the newly-copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the page or the type of access, the CPU fault handler 211 determines that a new ownership state for the page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the page is CPU-shared, and the memory page has been copied into the system memory 104. The page is accessible to the CPU 102, since the CPU page table 206 includes an entry that associates the virtual memory address with the memory page in the system memory 104. The page is also accessible to the PPU 202, since the PPU page table 208 includes an entry that associates the virtual memory address with the memory page in the system memory 104.

Detailed Example of a Page Fault Sequence

With this context, a detailed description of a page fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread enters a trap, stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to CPU-shared." This state indicates that the page is currently in the process of being transitioned to CPU-shared. When the PPU fault handler 215 runs on a microcontroller in the memory management unit, then two processors will update the PSD 210 asynchronously, using atomic compare-and-swap ("CAS") operations on the PSD 210 to change the state to "transitioning to GPU visible," (CPU-shared).

The PPU 202 updates the PPU page table 208 to associate the virtual address with the memory page. The PPU 202 also invalidates the TLB cache entries. Next, the PPU 202 performs another atomic compare-and-swap operation on the PSD 210 to change the ownership state associated with the memory page to CPU-shared. Finally, the page fault sequence ends, and the thread that requested the data via the virtual memory address resumes execution.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 21.

Migrating Memory Pages Based on Memory Access Patterns

To reduce the performance degradation associated with remedying page faults, memory pages that are frequently accessed by the PPU 202 preferentially reside in the PPU memory 204. Such memory pages are PPU-owned, accessible to only the PPU 202 and not the CPU 102. In certain applications, the memory access pattern of the memory pages included in the PPU memory 204 may vary over time. That is, the PPU 202 may access a particular memory page frequently for a period of time, and then later access that memory page only infrequently. Because the PPU memory 204 is relatively small, as compared to the system memory 104, performance may be increased by migrating memory pages that have fallen into disuse from the PPU memory 204 to the system memory 104.

Sliding Window Tracker

Figure 3:
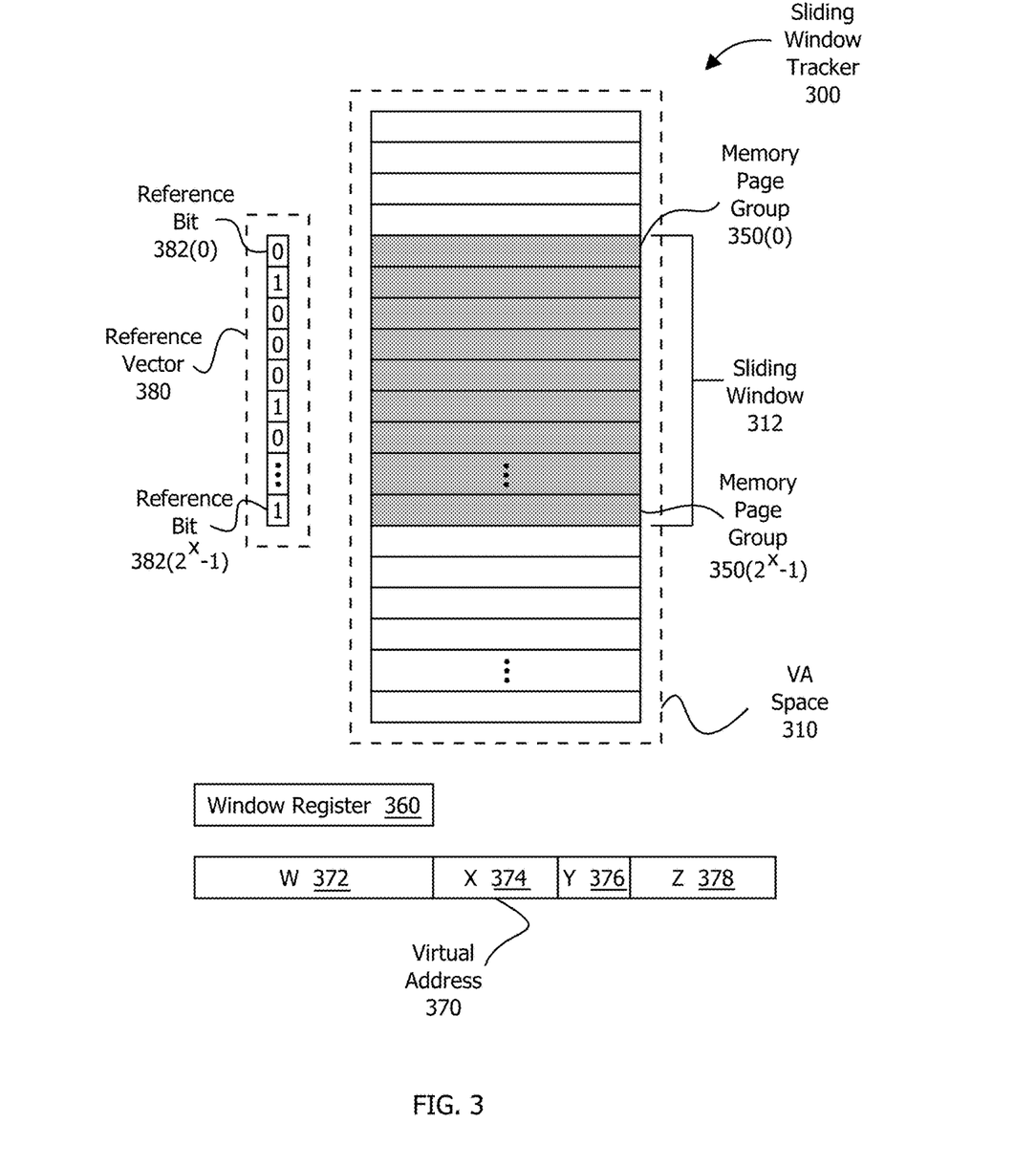
FIG. 3 is a conceptual diagram illustrating a sliding window tracker implemented within the PPU MMU 213 of FIG. 2, according to one embodiment of the present invention.

FIG. 3 is a conceptual diagram illustrating a sliding window tracker implemented within the PPU MMU 213 of FIG. 2, according to one embodiment of the present invention. In operation, the sliding window tracker 300 enables an operating system (OS) that executes on the CPU 102 to identify memory pages that have fallen into disuse. After identifying one or more such memory pages, the OS causes the UVM driver 101 to migrate these memory pages from the PPU memory 204 to the system memory 104.

In operation, the sliding window tracker 300 detects accesses to the PPU memory 204 via virtual addresses 370. In particular, the sliding window tracker 300 tracks memory accesses that lie within a sliding window 312, with the sliding window 312 being in a virtual address (VA) space 310. In general, the sliding window 312 is associated with a configurable span of virtual addresses, herein referred to as a window, that are included in the virtual address space 310. As shown, the sliding window 312 is divided into $2^W$ memory page groups 350(0)-350($2^W$-1), where each memory page group 350 includes the same number of memory pages. For instance, each memory page group 350 could include, without limitation, one, two, or sixteen memory pages.

Over time, the widow represented by the sliding window 312 may vary. For illustrative purposes, the memory page groups 350 that lie within the sliding window 312 at a particular point in time are depicted as filled boxes in FIG. 3. By contrast, the memory page groups 350 that lie outside the sliding window 312 at the particular point in time are depicted as unfilled boxes in FIG. 3.

The sliding window tracker 300 includes, without limitation, a window register 360 and a window reference vector 380. The window register 360 defines the base address of the sliding window 312 within the virtual address space 310. Accordingly, the window register 360 corresponds to the virtual address of the memory page group 350(0). In general, the number of bits included in the window register 360 determines the number of distinct sliding window locations that can be selected within the VA space 310. For example, if the window register 360 were to include twenty bits, then the VA space 310 would include $2^{20}$ distinct sliding window locations. In such a scenario, the sliding window tracker 300 would track accesses to one of the $2^{20}$ windows at any given time. In some embodiments, the possible sliding windows 312 overlap, while in other embodiments, the possible sliding windows 312 abut and do not overlap.

The reference vector 380 represents memory accesses to the memory groups 350 included in the sliding window 312. More specifically, for each memory page group 350, the reference vector 380 includes a reference bit 382. Each reference bit 382 indicates whether the PPU 202 has accessed any memory pages included in the corresponding memory group 350 since the time when the reference vector 380 was cleared. In some embodiments, the clearing can happen at any time, but it is preferable to clear the reference vector 380 when the location of the sliding window 312 is changed due the window register 360 being updated, so as to only need a single "atomic update and clear" operation. Hereinafter, it is assumed the reference vector 380 is cleared when the sliding window 312 is updated. As shown, the value of the reference bit 382(0) is zero, indicating that no memory pages included in the memory page group 350(0) was accessed since the window register 360 was last updated. By contrast, the value of the reference bit 382(1) is one, indicating that at least one memory page included in the memory page group 350(1) was accessed since the window register 360 was last updated.

To initialize the sliding window tracker 300, the OS selects a sliding window location and performs a write operation that stores the base address of the selected sliding window location in the window register 360. As part of the initialization process, either the sliding window tracker 300 hardware or the OS also performs write operations that sets the reference bits 382 in the reference vector 380 to an inactive value, such as zero. Further, the OS or the window tracker 300 hardware may invalid any number of entries included in any caches in the PPU 202, such as the entries in a translation look-aside buffer (TLB). For example, the OS may perform a flush operation on the TLB, in order to avoid missing the tracking of a page reference in embodiments that do not also track TLB hits. In some embodiments, the window tracker 300 tracks TLB hits. After initialization, the sliding window tracker 300 tracks accesses to memory pages that reside within the selected window.

In operation, when the PPU MMU 213 receives a request to translate a virtual address (VA) 370 to a physical memory address, the sliding window tracker 300 evaluates the VA 370 to determine the relationship of the VA 370 to the selected window. As part of evaluating the VA 370, the sliding window tracker 300 partitions the bits included in the VA 370 into four subsets of bits. The number of bits included in each subset may vary. As shown, a W 372 includes the highest-order bits, an X 372 includes the next highest-order bits, a Y 366 includes the following set of bits, and a Z 378 includes the lowest-order bits. The value of the W 372 corresponds to the base address of the particular sliding window location that includes the VA 370. When the sliding window 312 matches this particular window, the value of the X 374 corresponds to the particular memory page group 350 and associated reference bit 382 that represent the VA 370. The value of the Y 366 is associated with the number of pages included in each memory page group 350. Finally, the value of the Z 368 reflects the page size, such as 64 KB or 128 KB. Notably, the sum of the Y 366 and the Z 378 typically specifies the granularity of the tracking. In various embodiments, the W 372, X 374, Y 366, Z 378 bits can be repositioned or interleaved in any fashion. In alternate embodiments, the value of the W 372 is specified via a register. In such embodiments, software may configure the sliding window tracker 300 to create a coarse grained picture of the access pattern on one pass, and then a fine grained picture of the access pattern with a smaller sliding window 312 on a subsequent pass.

As persons skilled in the art will recognize, the number of bits included in the W 372 equals the number of bits included in the window register 360, and the reference vector 380 includes $2^X$ reference bits 382. Correspondingly, the sliding window 312 includes $2^X$ memory page groups 350, and assuming all pages are the same size, each memory page group 350 includes $2^Y$ pages. If the value of 376 the Y is zero, then each memory page group 350 includes a single memory page. For embodiments with multiple pages sizes, Y 376 and Z 378 together indicates the range of the virtual address space 310 that corresponds to one memory page group 350, even though different memory page groups 350 can have differing numbers of pages due to differing page sizes. The number of bits included in the window register 360, the number of reference bits 382, and the number of bits included in each of the W 372, the X 374, the Y 376, and the Z 378 subsets of bits may be selected in any consistent and technically feasible fashion. For instance, in some embodiments, the value for the Y 376 is selected such that each memory page group 350 includes a number of memory pages that is greater than or equal to the number of entries in a TLB line. In other embodiments, performance data may be used to select appropriate values for the X 374 and the Y 376. For example, suppose that the VA 370 includes 48 bits. In such a scenario, the sliding window tracker 300 may partition the VA 370, without limitation, according to one of the following approaches:

W=21, X=10, Y=1, Z=16
  $2^{21}$ windows of $2^{10}$ (1024) paired $2^{16}$ (64 KBs)
W=21, X=10, Y=0, Z=17
  $2^{21}$ windows of 1024 separate 128 KB
W=20. X=10. Y=1, Z=17
  $2^{20}$ windows of 1024 paired 128 KBs
W=17, X=10, Y=4, Z=17
  $2^{17}$ windows of 1024 2 MBs 16 128 KBs After partitioning the VA 370, the sliding window tracker 300 determines whether to track the memory access based on whether the VA 370 lies within the sliding window 312. First, the sliding window tracker 300 performs a comparison operation between the W 372 and the window register 360. If the value of the W 372 does not equal the value of the window register 360, then the VA 370 is not represented by the sliding window 312 and the sliding window tracker 300 does not track the memory access. By contrast, if the value of the W 372 equals the value of the window register 360, then the VA 370 is represented by the sliding window 312, and the sliding window tracker 300 updates the reference vector 380. More specifically, the sliding window tracker 300 selects the appropriate reference bit 382 based on the X 374 in the VA 370 and then sets the value of the selected reference bit 382 to an activate value, such as one. For example, if the reference vector 380 includes 1024 ($2^{10}$) bits, then the X 374 includes 10 bits. In such a scenario, if the value of the X 374 were to equal 640, then the sliding window tracker 300 would set to reference bit 382 (640) of the reference vector 380 to the active value. In some embodiments, the sliding window 312 does not cover an integer power of two number of bytes, which means the determination of whether to track a memory access is done with arithmetic comparisons. Such embodiments also include a size parameter for the size of the sliding window 312.

After some period of time, the OS performs read operations on the reference vector 380 to determine which of the memory page groups 360 were accessed since the sliding window tracker 300 was initialized for the selected window. At this point in time, the reference vector 380 reflects an approximate least-recently-used memory pattern for the memory page groups 360 within the sliding window 312. If the value of a particular reference bit 382 equals the active value (i.e., the reference bit 382 is active), then the OS recognizes that at least one of the memory pages included in the corresponding memory page group 350 was accessed since initialization. By contrast, if the value of a particular reference bit 382 equals the inactive value (i.e., the reference bit 382 is inactive), then the OS recognizes that none of the memory pages included in the corresponding memory page group 350 was accessed since initialization.

In one embodiment, the OS then selects the memory pages in one or more memory page groups 360 corresponding to inactive reference bits 382 as candidates for migration from the PPU memory 204 to the system memory 104. By selecting memory pages that have fallen into disuse for migration, the likelihood of subsequent PPU 202 accesses to these memory pages is decreased compared to randomly selecting memory pages for migration. After scheduling the memory pages for migration, the OS selects a new window and re-initializes the sliding window tracker 300 to begin tracking the virtual addressed that lie within the newly selected window.

The OS may read the reference vector 380 and select memory pages for migration in any technically feasible fashion at any time. For example, in some embodiments, the OS may read the reference vector 380 and select memory pages for migration as part of a background process that maintains a pool of unused physical pages included in the PPU memory 204. Further, as part of another background process, the OS may opportunistically perform zero-fill operations that fill unmapped physical pages with zeros, in anticipation of malloc( ) operations that result in "zero fill on demand" (ZFOD) pages. In yet other embodiments, the OS may read the reference vector 380 and select memory pages for migration when the number of unused physical pages included in the PPU memory 204 falls below a minimum threshold. Finally, the OS may select windows to track in any technically feasible fashion and may re-initialize the sliding window tracker 300 any number of times—causing the sliding window tracker 300 to track a different window after each re-initialization.

In alternate embodiments, any software may interact with the sliding window tracker 300 instead of the OS. In some alternate embodiments, the sliding window tracker 300 may be implemented as a dedicated hardware unit, in any existing unit within the PPU 202, in conjunction with the PPU memory 204, or in combination with the PPU MMU 213. In yet other alternate embodiments, the computer system 100 may implement a sliding window tracker 300 enable/disable mechanism that controls whether the sliding window tracker 300 tracks memory accesses.

In yet other embodiments, the sliding window tracker 300 may be configured to track memory accesses issued by any processing unit and coupled to any memory unit. For instance, a CPU may include a sliding window tracker to determine which pages to store in the system memory. Such an embodiment may be implemented in a UVM architecture or any other technically feasible architecture.

Figure 4:
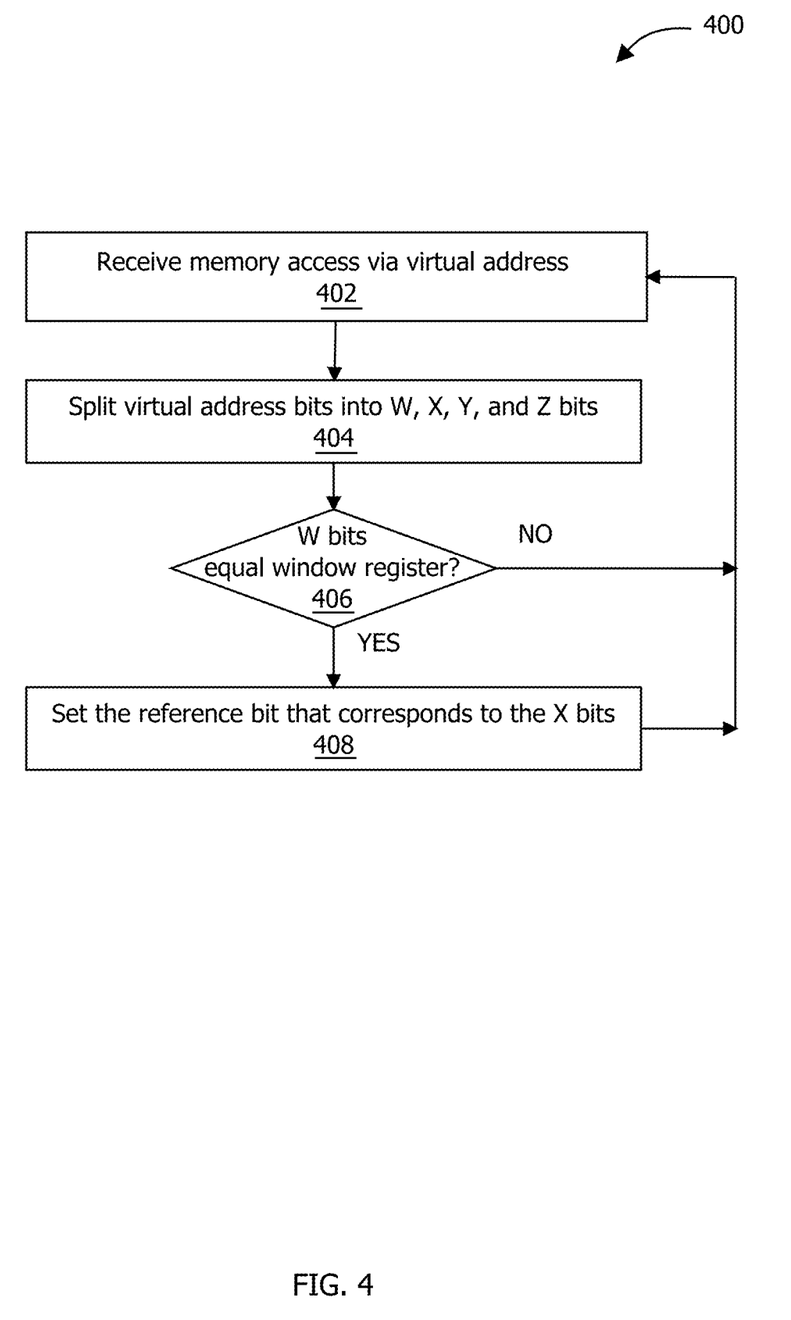
FIG. 4 is a flow diagram of method steps for tracking memory access operations, according to one embodiment of the present invention.

FIG. 4 is a flow diagram of method steps for tracking memory access operations, according to one embodiment of the present invention. Although the method steps are described herein in conjunction with the systems of FIGS. 1-3, persons skilled in the art will understand that any system configured to implement the method steps, in any order, falls within the scope of the present invention.

As shown, a method 400 begins at step 402, where the PPU MMU 213 receives a memory access request via a particular virtual address (VA) 370. At step 404, the sliding window tracker 300 implemented within the PPU MMU 213 splits the virtual address 370 into four subsets of bits: the W 372, the X 374, the Y 376, and the Z 378 subsets of bits. The number of bits included in each subset of bits may be determined in any technically feasible fashion that is consistent with the architecture of the PPU 202. As outlined previously herein, the value of the W 372 reflects the base address of a particular window of virtual addresses that includes the virtual address 370. Notably, the sliding window tracker 300 is configured to track memory accesses to the window that corresponds to a base window address stored in the window register 360 (i.e., the sliding window 312).

At step 406, if the sliding window tracker 300 determines that the value of the W 372 does not equal the value of the window register 360, then the sliding window tracker 300 does not track the memory access, and the method 400 returns to step 402. The PPU MMU 213 cycles through steps 402-406, processing memory access requests without tracking the memory accesses until receiving a memory access request via a particular virtual address 370 that lies within the sliding window 312.

If, at step 406, the sliding window tracker 300 determines that the value of the W 372 equals the value of the window register 360, then the sliding window tracker 300 tracks the memory access using the reference vector 360. As detailed in conjunction with FIG. 3, the value of the X 374 corresponds to a particular memory page group 350 and associated reference bit 382 that represent the virtual address 370. To track the memory access, the sliding window tracker 300 selects the appropriate reference bit 382 based on the X 374 in the VA 370 and then sets the value of the selected reference bit 382 to an active value, such as one. After tracking the memory access in this fashion, the method 400 returns to step 402. The PPU MMU 213 cycles through steps 402-408, continuing to process memory access requests and tracking memory accesses for the virtual addresses 370 that lie within the sliding window 312. Throughout time, the value of the window register 360 may vary and the virtual addresses 370 that lie within the sliding window 312 vary accordingly.

Figure 5:
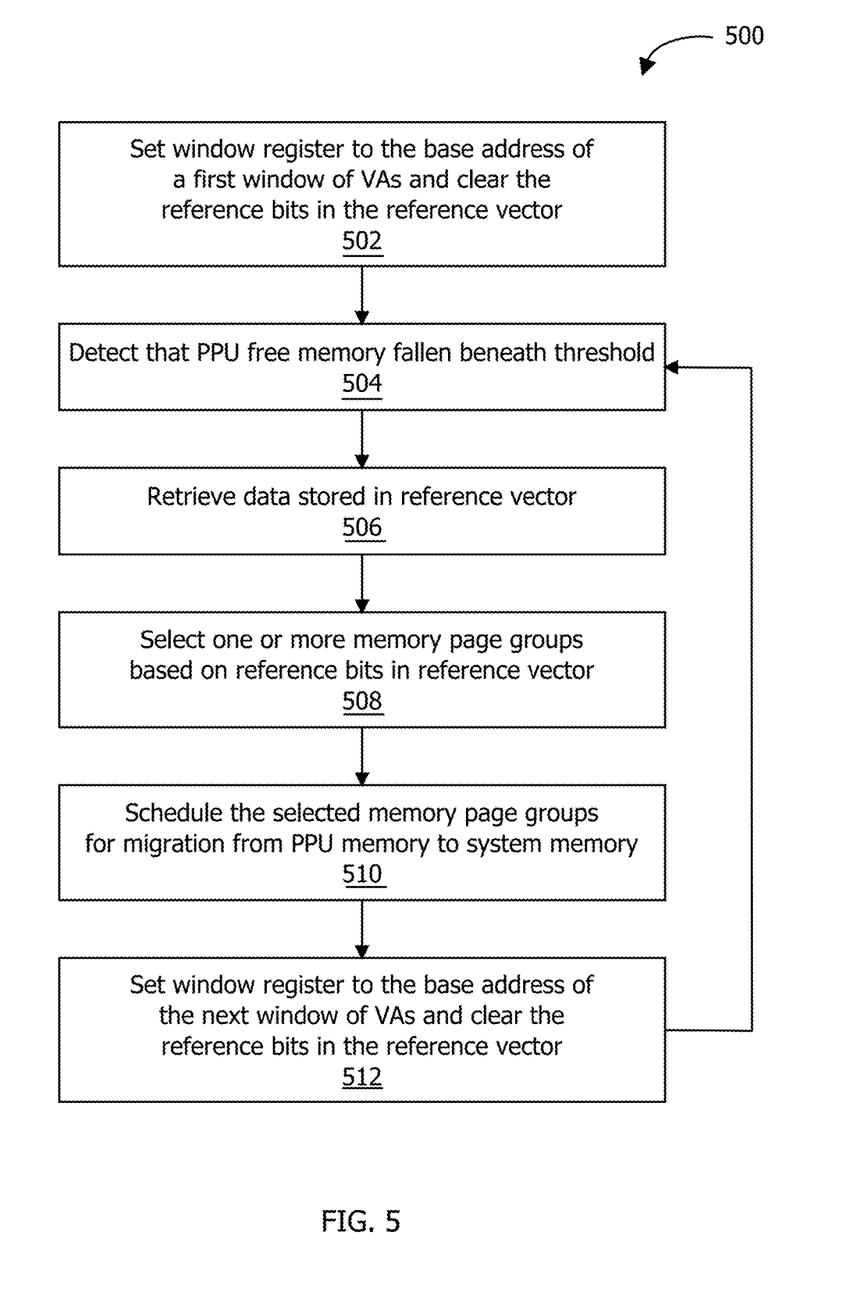
FIG. 5 is a flow diagram of method steps for migrating memory pages between memories based on one or more memory access operations, according to one embodiment of the present invention.

FIG. 5 is a flow diagram of method steps for migrating memory pages between memories based on one or more memory access operations, according to one embodiment of the present invention. Although the method steps are described herein in conjunction with the systems of FIGS. 1-3, persons skilled in the art will understand that any system configured to implement the method steps, in any order, falls within the scope of the present invention.

As shown, a method 500 begins at step 502, where an OS selects a first window of virtual addresses and performs a write operation that stores the base address of the selected window in the window register 360. Further, the OS performs write operations that sets the reference bits 382 in the reference vector 380 to an inactive value, such as zero. Setting the window register 360 and the reference vector 380 in this fashion configures sliding window tracker 300 implemented in the PPU MMU 213 to track memory accesses via virtual addresses that lie within the selected window.

At step 504, the OS detects that the number of unused physical pages included in the PPU memory 204 has fallen below a minimum threshold. This minimum threshold may be selected in any technically feasible fashion and may be selected to optimize PPU 202 performance. In alternate embodiments, step 504 can be replaced by a step that waits for a timer to expire, indicating the end of a time period to accumulate page accesses. At step 506, the OS performs read operations on the reference vector 380. Each reference bit 382 included in the reference vector 380 represents a different memory page group 360 of one or more memory pages accessed via virtual addresses that lie within the selected window. Advantageously, the reference vector 380 reflects an approximate least-recently-used memory pattern for the memory page groups 360 within the selected window.

At step 508, the OS selects one or more memory page groups 360 corresponding to inactive reference bits 382. As outlined previously herein, an inactive reference bit 382 indicates that the memory pages included in the corresponding memory page group 360 have fallen into disuse. At step 510, the OS schedules one or more of the memory pages included in the selected memory page groups 360 for migration from the PPU memory 204 to the system memory 104.

At step 512, the OS selects a new window of virtual addresses and performs a write operation that stores the base address of the new window in the window register 360. Further, the OS performs write operations that sets the reference bits 382 in the reference vector 380 to an inactive value, such as zero. Setting the window register 360 and the reference vector 380 in this fashion configures the sliding window tracker 300 implemented in the PPU MMU 213 to track memory accesses via virtual addresses that lie within the new window instead of the first window. As part of step 512, the OS may invalid any number of entries included in any caches in the PPU 202, such as the entries in a translation look-aside buffer (TLB). The OS continues to cycle through steps 504-512, configuring the sliding window tracker 300 to track different windows, selecting memory pages that have fallen into disuse, and scheduling such memory pages for migration.

In sum, a sliding window tracker implemented in the PPU MMU tracks access to a window of memory pages included in the PPU memory. At any given time, a sliding window is associated with a selected window that spans a particular region of the virtual address space. Memory page groups included in the selected window are associated with different reference bits included in a reference vector. First, an operating system (OS) initializes the sliding window tracker by writing a window base address to a window address register and setting the reference bits to an inactive value. After initialization, the sliding window tracker tracks accesses to the memory pages that reside within the selected window. When the PPU MMU receives a memory access request, the sliding window tracker sets the reference bit corresponding to the memory page group that is associated with the memory access request to an active value.

After some period of time, the OS performs read operations on the reference vector to determine which memory page groups were accessed since the sliding window access tracking mechanism was initialized for the selected window. An activated reference bit in the reference vector indicates that the corresponding memory page group was accessed since initialization, whereas an inactivated reference bit indicates that the corresponding memory page group was not accessed since initialization. The OS preferentially selects one or memory page groups corresponding to inactive reference bits for migration from the PPU memory to the system memory. Subsequently, the OS re-initializes the sliding window tracker to begin tracking a different window that spans a different region of the virtual address space.

Advantageously, the sliding window tracker enables the OS to judiciously select which memory pages to schedule for migration from the PPU memory to the system memory. Consequently, the sliding window tracker reduces the likelihood (compared to conventional random selection techniques) that the UVM driver performs migration operations on a PPU memory page that the PPU subsequently accesses. Accordingly, PPU performance is improved. Further, since the sliding window tracker does not provoke page faults to track the memory accesses, the overall system performance is improved relative to conventional fault-based memory access tracking techniques. In addition, only a portion of the virtual address space is tracked at any given time, therefore the memory dedicated to tracking the memory accesses is optimized.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A system, comprising:
a memory management unit that includes a sliding window tracker configured to:
detect a first access operation associated with a first memory page group included within a sliding window;
set a first reference bit corresponding to the first memory page group; and
based on a second reference bit corresponding to a second memory page group, cause a memory page in the second memory page group to migrate from a second memory to a first memory.

2. The system of claim 1, wherein the second memory is partitioned into a plurality of memory page windows, each memory page window includes one or more memory page groups, and each reference corresponds to a different memory page group.

3. The system of claim 2, wherein each of the memory page groups includes only one memory page.

4. The system of claim 2, wherein each of the memory page groups includes only two memory pages.

5. The system of claim 2, wherein each of the memory page groups includes a number of memory pages capable of being referenced by a single entry in a translation lookaside buffer.

6. The system of claim 1, wherein the sliding window is defined based on a virtual base address stored in a window register and associated with the first memory page group.

7. The system of claim 6, where in the sliding window tracker is further configured to perform one or more comparison operations between a virtual address associated with the first access operation and a plurality of bits associated with the window register to determine that the first access operation is associated with the sliding window.

8. The system of claim 1, wherein the sliding window tracker is further configured to perform a plurality of write operations to set each reference bit to an inactive value prior to detecting the first access operation.

9. The system of claim 1, wherein the sliding window tracker is further configured to locate the first reference bit within a reference vector based on a virtual address associated with the first access operation.

10. The system of claim 1, wherein setting the first reference bit comprises setting the first reference bit to an active value, and causing the memory page in the second memory page group to migrate from the second memory to the first memory is in response to the active value of the first reference bit and an inactive value of the second reference bit.

11. A computer-implemented method for selecting memory pages to migrate to a first memory from a second memory in a unified virtual memory system, the method comprising:
detecting a first access operation associated with a first memory page group included within a sliding window;
performing a write operation to set a first reference bit corresponding to the first memory page group to an active value; and
in response to the active value of the first reference bit and an inactive value of a second reference bit corresponding to a second memory page group, causing a memory page in the second memory page group to migrate from the second memory to the first memory.

12. The method of claim 11, wherein the second memory is partitioned into a plurality of memory page windows, each memory page window includes one or more memory page groups, and each reference corresponds to a different memory page group.

13. The method of claim 12, wherein each of the memory page groups includes only one memory page.

14. The method of claim 12, wherein each of the memory page groups includes only two memory pages.

15. The method of claim 12, wherein each of the memory page groups includes a number of memory pages capable of being referenced by a single entry in a translation lookaside buffer.

16. The method of claim 12, wherein the sliding window is defined based on a virtual base address stored in a window register and associated with the first memory page group.

17. The method of claim 16, further comprising performing one or more comparison operations between a virtual address associated with the first access operation and a plurality of bits associated with the window register to determine that the first access operation is associated with the sliding window.

18. The method of claim 11, further comprising performing a plurality of write operations to set each of the reference bits included in a reference vector to an inactive value prior to detecting the first access operation.

19. The method of claim 11, further comprising locating the first reference bit within a reference vector based on a virtual address associated with the first access operation.

20. A computing device comprising:
a first processor;
a first memory associated with the first processor;
a second processor; and
a second memory associated with the second processor,
wherein the second processor includes a memory management unit that includes
a sliding window tracker configured to:
detect a first access operation associated with a first memory page group included within a sliding window;
set a first reference bit corresponding to the first memory page group to an active value; and
in response to an inactive value of a second reference bit corresponding to a second memory page group, cause a memory page in the second memory page group to migrate from a second memory to a first memory.

21. The computing device of claim 20, wherein the second memory is partitioned into a plurality of memory page windows, each memory page window includes one or more memory page groups, and each reference corresponds to a different memory page group.

22. The computing device of claim 20, wherein the second memory page group is also included within the sliding window.

23. The computing device of claim 20, wherein causing the memory page in the second memory page group to migrate from the second memory to the first memory is further in response to the active value of the first reference bit.

* * * * *